United States Patent
Boday et al.

(10) Patent No.: US 11,120,827 B2
(45) Date of Patent: *Sep. 14, 2021

(54) CONDUCTIVE POLYMERS FOR USE IN MAGNETIC MEDIA

(71) Applicant: International Business Machines Corporation, Armonk, NY (US)

(72) Inventors: Dylan J. Boday, Tucson, AZ (US); Diana J. Hellman, Tucson, AZ (US); Icko E. T. Iben, Santa Clara, CA (US); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/719,318

(22) Filed: Sep. 28, 2017

(65) Prior Publication Data
US 2018/0018994 A1 Jan. 18, 2018

Related U.S. Application Data (63) Continuation of application No. 14/444,810, filed on Jul. 28, 2014, now Pat. No. 9,858,956.

(51) Int. Cl.
*G11B 5/702* (2006.01)
(52) U.S. Cl.
CPC .................. *G11B 5/7023* (2013.01)
(58) Field of Classification Search
CPC ................. G11B 5/70; G11B 5/7023
See application file for complete search history.

(56) References Cited

U.S. PATENT DOCUMENTS

| | | |
|---|---|---|
| 3,150,939 A | 9/1964 | Wenner |
| 3,440,091 A | 4/1969 | Delmore |
| 3,515,939 A | 6/1970 | Wenner |
| 4,617,226 A | 10/1986 | Yamaguchi et al. |
| 4,713,288 A | 12/1987 | Kokaku et al. |
| 5,049,684 A | 9/1991 | Tomibe et al. |
| 5,079,096 A | 1/1992 | Miyake et al. |
| 5,479,311 A | 12/1995 | Doushita et al. |
| 5,510,168 A | 4/1996 | Mori et al. |

(Continued)

FOREIGN PATENT DOCUMENTS

| | | |
|---|---|---|
| JP | S60205820 A | 10/1985 |
| JP | S62115036 A | 5/1987 |

OTHER PUBLICATIONS

Boday et al., U.S. Appl. No. 14/444,810, filed Jul. 28, 2014.

(Continued)

*Primary Examiner* — Holly Rickman
*Assistant Examiner* — Linda N Chau
(74) *Attorney, Agent, or Firm* — Zilka-Kotab, P.C.

(57) ABSTRACT

According to one embodiment, a magnetic recording medium includes: a substrate; an underlayer positioned above the substrate; a magnetic recording layer positioned above the underlayer; and a plurality of conductive polymers dispersed within the substrate, the underlayer, the magnetic recording layer, the substrate and the underlayer, the substrate and the magnetic recording layer, the underlayer and the magnetic recording layer, or the underlayer, the magnetic recording layer, and the substrate. In addition, the conductive polymers are dispersed such that a concentration of the conductive polymers has a gradient in a single one of the layers in a thickness direction.

19 Claims, 8 Drawing Sheets

(56) References Cited

U.S. PATENT DOCUMENTS

| | | |
|---|---|---|
| 6,367,411 B2 | 4/2002 | Ogawa et al. |
| 7,108,927 B2 | 9/2006 | Hattori et al. |
| 9,858,956 B2 | 1/2018 | Boday et al. |
| 2004/0001974 A1 | 1/2004 | Sharrock |
| 2007/0287032 A1 | 12/2007 | Nakai et al. |
| 2009/0142622 A1 | 6/2009 | Nakamura |
| 2011/0305924 A1 | 12/2011 | Pyun et al. |
| 2016/0027460 A1 | 1/2016 | Boday et al. |

OTHER PUBLICATIONS

Non-Final Office Action from U.S. Appl. No. 14/444,810, dated Jul. 29, 2015.
Final Office Action from U.S. Appl. No. 14/444,810, dated Jan. 26, 2016.
Non-Final Office Action from U.S. Appl. No. 14/444,810, dated Jun. 3, 2016.
Final Office Action from U.S. Appl. No. 14/444,810, dated Dec. 15, 2016.
Notice of Allowance from U.S. Appl. No. 14/444,810, dated Aug. 28, 2017.
List of IBM Patents Or Patent Applications Treated As Related.

CONDUCTIVE POLYMERS FOR USE IN MAGNETIC MEDIA

BACKGROUND

The present invention relates to data storage systems, and more particularly, this invention relates to conductive polymers which may be particularly useful for magnetic recording media.

In magnetic storage systems, magnetic transducers read data from, and write data onto, magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

In a magnetic tape drive system, a magnetic tape, which includes a plurality of laterally positioned data tacks extending along the length of the tape, is drawn across the magnetic head (i.e., the magnetic read/write transducer). The magnetic tape head can thus record and read data along the length of the magnetic tape surface as relative movement occurs between the magnetic head and the tape.

In a magnetic disk drive system, a magnetic disk rotates at high speed while a magnetic head "flies" slightly above the surface of the rotating disk. The magnetic disk is typically rotated by means of a spindle drive motor.

Magnetoresistive (MR) sensors are particularly useful as read elements in magnetic heads, used in the data storage industry for high data recording densities. Three examples of MR materials used in the storage industry are anisotropic magnetoresistive (AMR), giant magnetoresistive (GMR) and tunneling magnetoresistive (TMR). An MR sensor is one whose resistance is changed by a magnetic field. MR, e.g., AMR, GMR and TMR, sensors are deposited as small and thin multi-layered sheet resistors on a structural substrate. The sheet resistors can be coupled to external devices by contact to metal pads which are electrically connected to the sheet resistors. MR sensors provide a high output signal which is not directly related to the head velocity as in the case of inductive read heads.

An important and continuing goal in the data storage industry is that of increasing the density of data stored on a medium recording medium. Efforts to achieve this goal may involve increasing the track and linear bit density on the magnetic recording medium. Additionally, efforts to achieve higher areal densities may also involve minimizing the spacing between the magnetic recording head(s) and the magnetic recording medium (i.e., the head-media spacing (HMS)). In particular, it is desirable to have the recording gaps of the transducers, which are the source of the magnetic recording flux, in near contact with the magnetic recording medium to effect writing sharp transitions, and to have the read elements in near contact with the magnetic recording medium to provide effective coupling of the magnetic field from the medium to the read elements. One further means of achieving high areal densities may involve fabrication of MR sensors with commensurately smaller dimensions.

However, the development of small footprint, higher performance magnetic storage systems is not without challenges. For instance, with reduced HMS and smaller sensor dimensions, the more sensitive the thin sheet resistors become to damage from spurious current or voltage spikes.

A major problem that is encountered during manufacturing, handling and use of MR sheet resistors as magnetic recording transducers is the buildup of electrostatic charges on the various elements of a head or other objects which come into contact with the sensors, particularly sensors of the thin film type, and the accompanying spurious discharge of the static electricity thus generated. Static charges may be externally produced and accumulate on instruments used by persons performing head manufacturing or testing function. These static charges may be discharged through the head, causing physical and/or magnetic damage to the sensors.

As described above, when a head is exposed to voltage or current inputs which are larger than that intended under normal operating conditions, the sensor and other parts of the head may be damaged. This sensitivity to electrical damage is particularly severe for MR read sensors because of their relatively small physical size. For example, an MR sensor used for high recording densities for magnetic tape media (on the order of 25 MBytes/cm$^2$) are patterned as resistive sheets of MR and accompanying materials, and will have a combined thickness for the sensor sheets on the order of 500 Angstroms (Å) with a width of a few microns ($\mu$m) and a height on the order of 1 $\mu$m. Sensors used in extant disk drives are even smaller. Discharge currents of tens of milliamps through such a small resistor can cause severe damage or complete destruction of the MR sensor. The nature of the damage which may be experienced by an MR sensor varies significantly, including complete destruction of the sensor via melting and evaporation, oxidation of materials at the air bearing surface (ABS), generation of shorts via electrical breakdown, and milder forms of magnetic or physical damage in which the head performance may be degraded. Short time current or voltage pulses which cause extensive physical damage to a sensor are termed electrostatic discharge (ESD) pulses.

One major source of ESD damage is associated with tribocharging of the magnetic recording medium. Such tribocharging, which arises via frictional contact between the magnetic recording medium and the magnetic recording head, may lead to increased error rates and/or damage to the head, as discussed above.

BRIEF SUMMARY

According to one embodiment, a magnetic recording medium includes: a substrate; an underlayer positioned above the substrate; a magnetic recording layer positioned above the underlayer; and a plurality of conductive polymers dispersed within the substrate, the underlayer, the magnetic recording layer, the substrate and the underlayer, the substrate and the magnetic recording layer, the underlayer and the magnetic recording layer, or the underlayer, the magnetic recording layer, and the substrate. In addition, the conductive polymers are dispersed such that a concentration of the conductive polymers has a gradient in a single one of the layers in a thickness direction.

According to another embodiment, a magnetic recording medium includes: a substrate, an underlayer positioned above the substrate, a magnetic recording layer positioned above the underlayer, a first plurality of conductive polymers dispersed within the magnetic recording layer, and a second plurality of conductive polymers dispersed in at least one layer selected from the group consisting of: the substrate, the underlayer, and a back coat layer.

According to yet another embodiment, a magnetic recording medium includes: a substrate, an underlayer positioned above the substrate, a magnetic recording layer positioned above the underlayer, and a first plurality of conductive polymers dispersed within the magnetic recording layer, a second plurality of conductive polymers dispersed within the substrate, a third plurality of conductive polymers dispersed within the underlayer, and a fourth plurality of conductive polymers dispersed within a back coat layer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 Å refers to a thickness of 10 Å±1 Å.

The following description discloses several preferred embodiments of magnetic storage systems, as well as operation and/or component parts thereof.

In one general embodiment, a magnetic recording medium includes: a substrate; an underlayer positioned above the substrate; a magnetic recording layer positioned above the underlayer; and a plurality of conductive polymers dispersed within at least one of the substrate, the underlayer and the magnetic recording layer.

In another general embodiment, a magnetic recording medium includes: a back coat layer; a substrate positioned above the back layer; an underlayer positioned above the substrate; a magnetic recording layer positioned above the underlayer; and a plurality of conductive polymers uniformly dispersed within at least one of the back coat layer, the substrate, the underlayer, and the magnetic recording layer; where the magnetic recording medium has a surface electrical resistance of less than or equal to about $10^7$ Ω/sq.

Figure 1A:
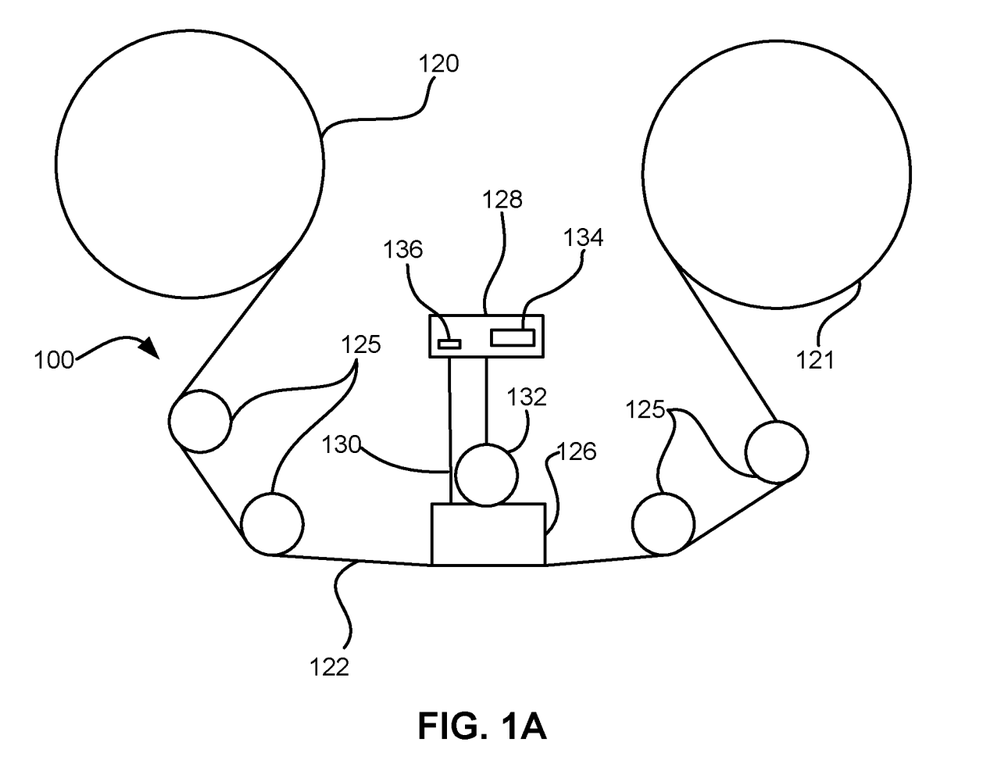
FIG. 1A is a schematic diagram of a simplified tape drive system according to one embodiment.

FIG. 1A illustrates a simplified tape drive 100 of a tape-based data storage system, which may be employed in the context of the present invention. As an option, the tape drive 100 may be implemented in conjunction with features from any other embodiment listed herein, such as those described with reference to the other FIGS. Of course, the tape drive 100 and others presented herein may be used in various applications and/or in permutations which may or may not be specifically described in the illustrative embodiments listed herein. Moreover, while one specific implementation of a tape drive is shown in FIG. 1A, it should be noted that the embodiments described herein may be implemented in the context of any type of tape drive system.

As shown in FIG. 1A, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
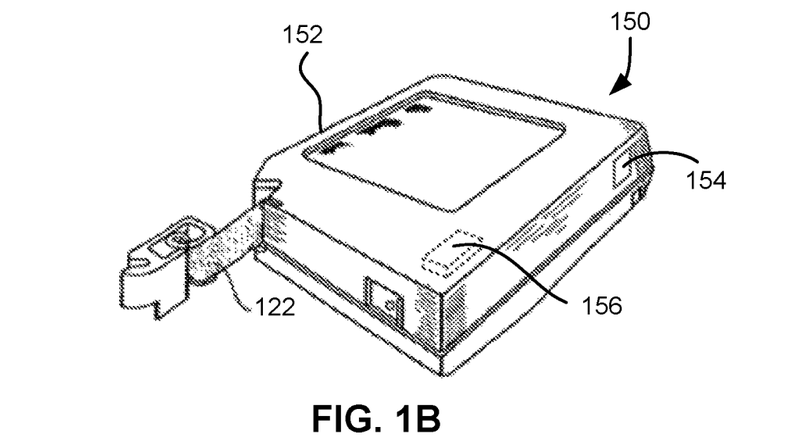
FIG. 1B is a schematic diagram of a tape cartridge, according to one embodiment.

FIG. 1B illustrates an exemplary tape cartridge 150 according to one embodiment, which may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2A:
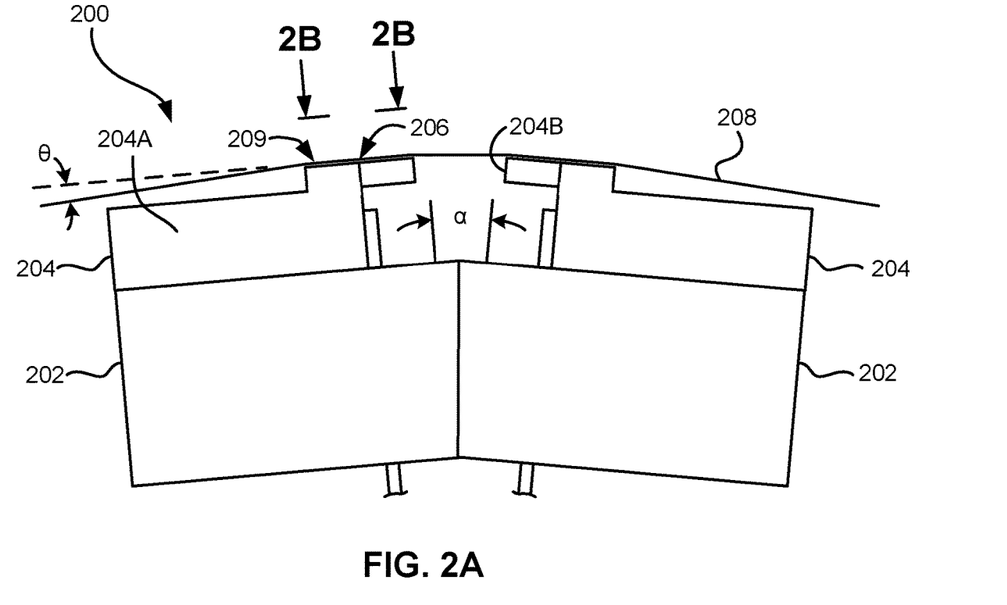
FIG. 2A illustrates a side view of a flat-lapped, bi-directional, two-module magnetic tape head, according to one embodiment.

By way of example, FIG. 2A illustrates a side view of a flat-lapped, bi-directional, two-module magnetic tape head 200, according to one embodiment. The magnetic tape head 200 may be implemented in conjunction with features from any other embodiment listed herein, such as those described with reference to the other FIGS. Of course, the magnetic tape head 200 and others presented herein may be used in various applications and/or in permutations which may or may not be specifically described in the illustrative embodiments listed herein.

As shown in FIG. 2A, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
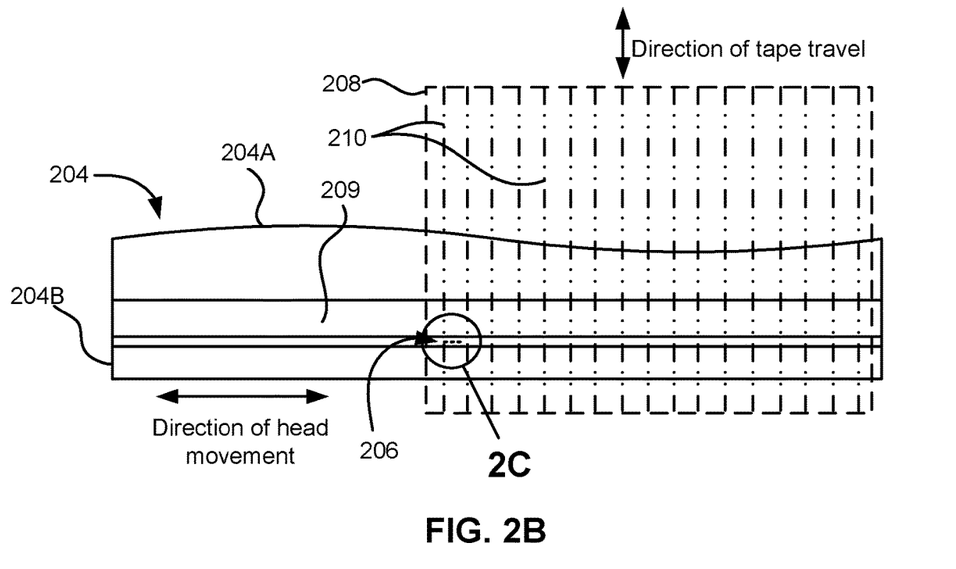
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example shown in FIG. 2B, the tape 208 includes 4 to 22 data bands, e.g., with 16 data bands and 17 servo tracks 210, on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
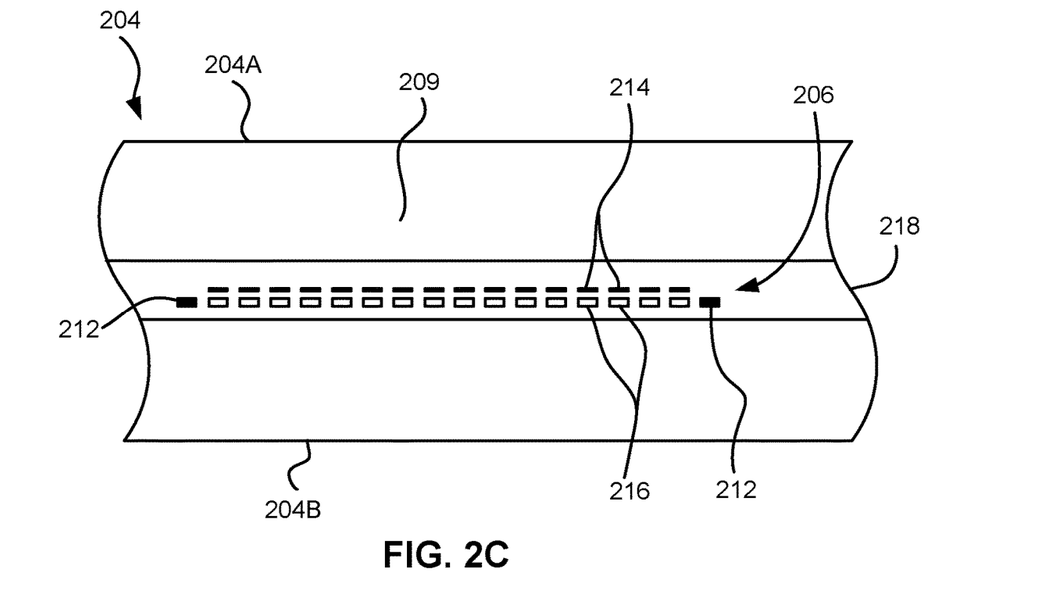
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A-2C together, each module 204 may include a complementary set of readers and/or writers 206 for such things as bi-directional reading and writing, read-while-write capability, backward compatibility, etc.

Figure 2D:
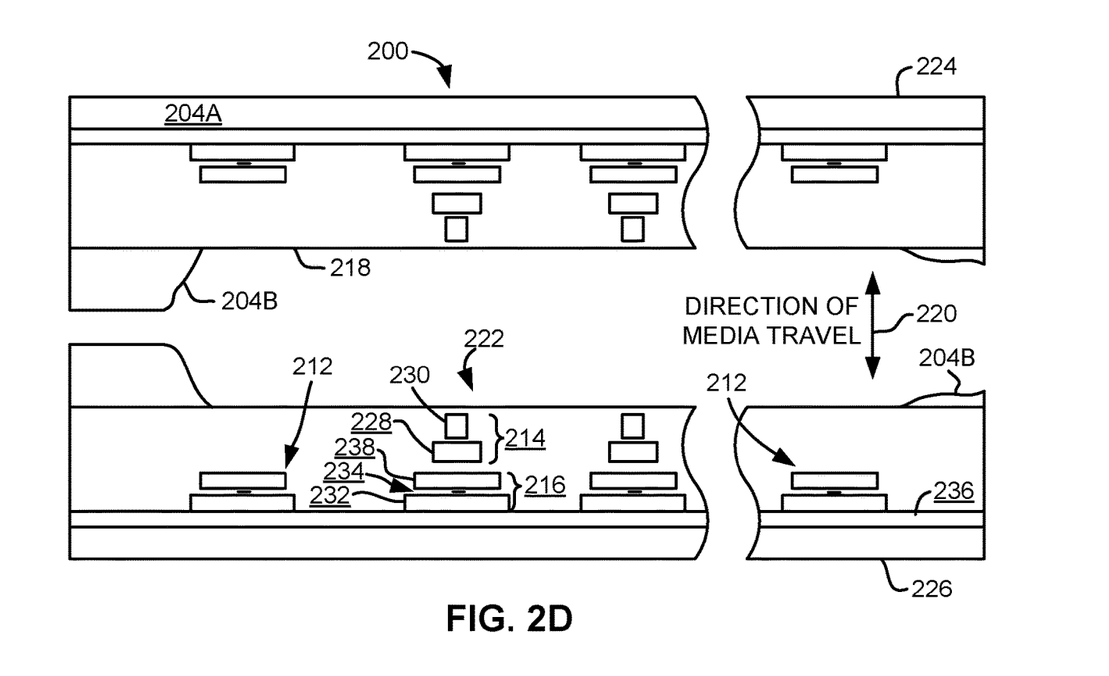
FIG. 2D is a detailed view of a partial tape bearing surface of a pair of modules.

FIG. 2D shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium there across to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel there across. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
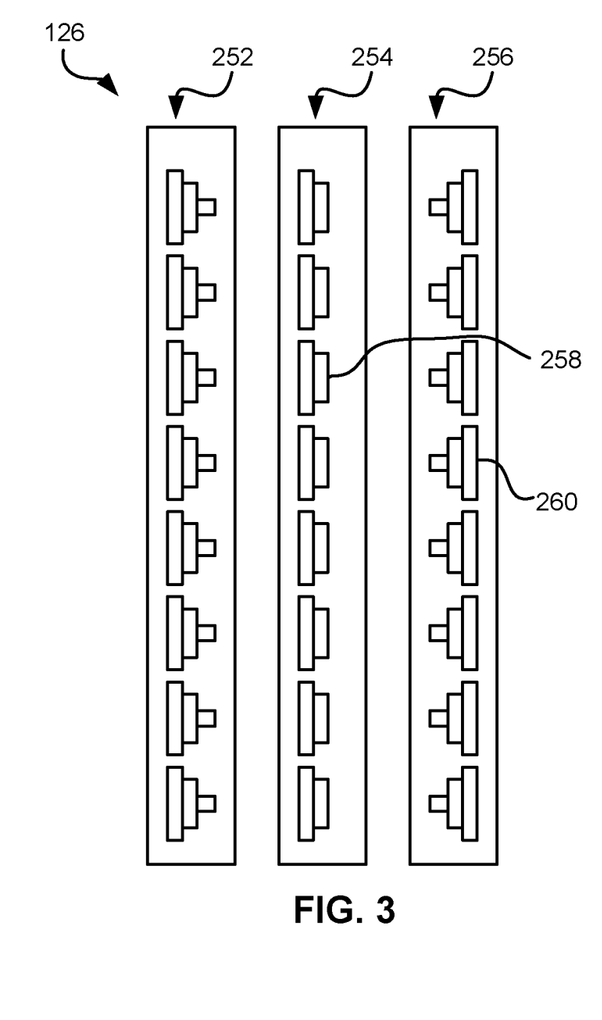
FIG. 3 is a partial tape bearing surface view of a magnetic head having a write-read-write configuration, according to one embodiment.
Figure 4:
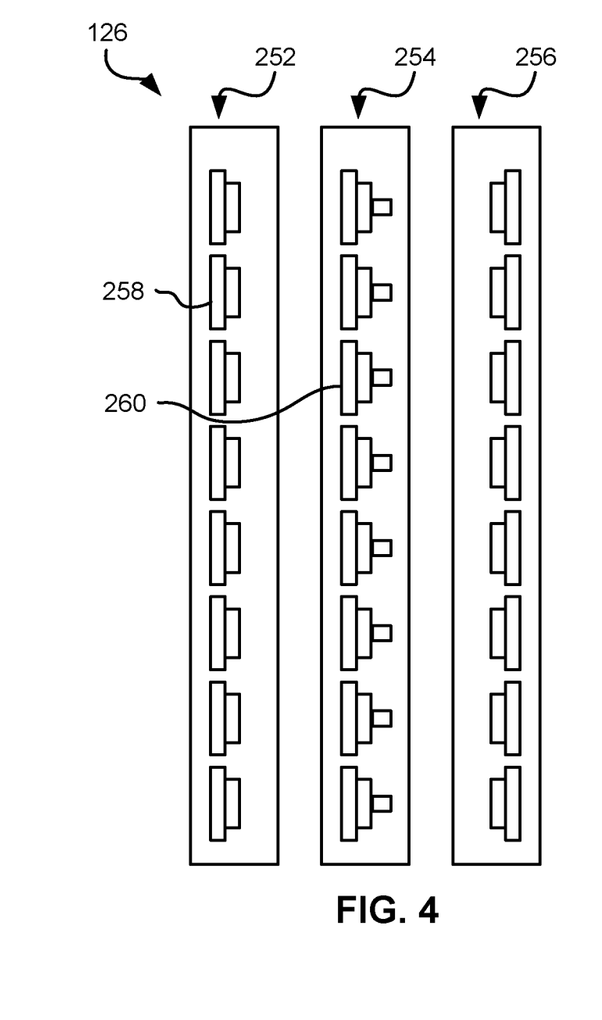
FIG. 4 is a partial tape bearing surface view of a magnetic head having a read-write-read configuration, according to one embodiment.

The configuration of the tape head 126 may include multiple modules, preferably three or more, according to one embodiment. In a write-read-write (W-R-W) head, outer modules for writing flank one or more inner modules for reading. FIG. 3 depicts a W-R-W configuration, according to one particular approach, where the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
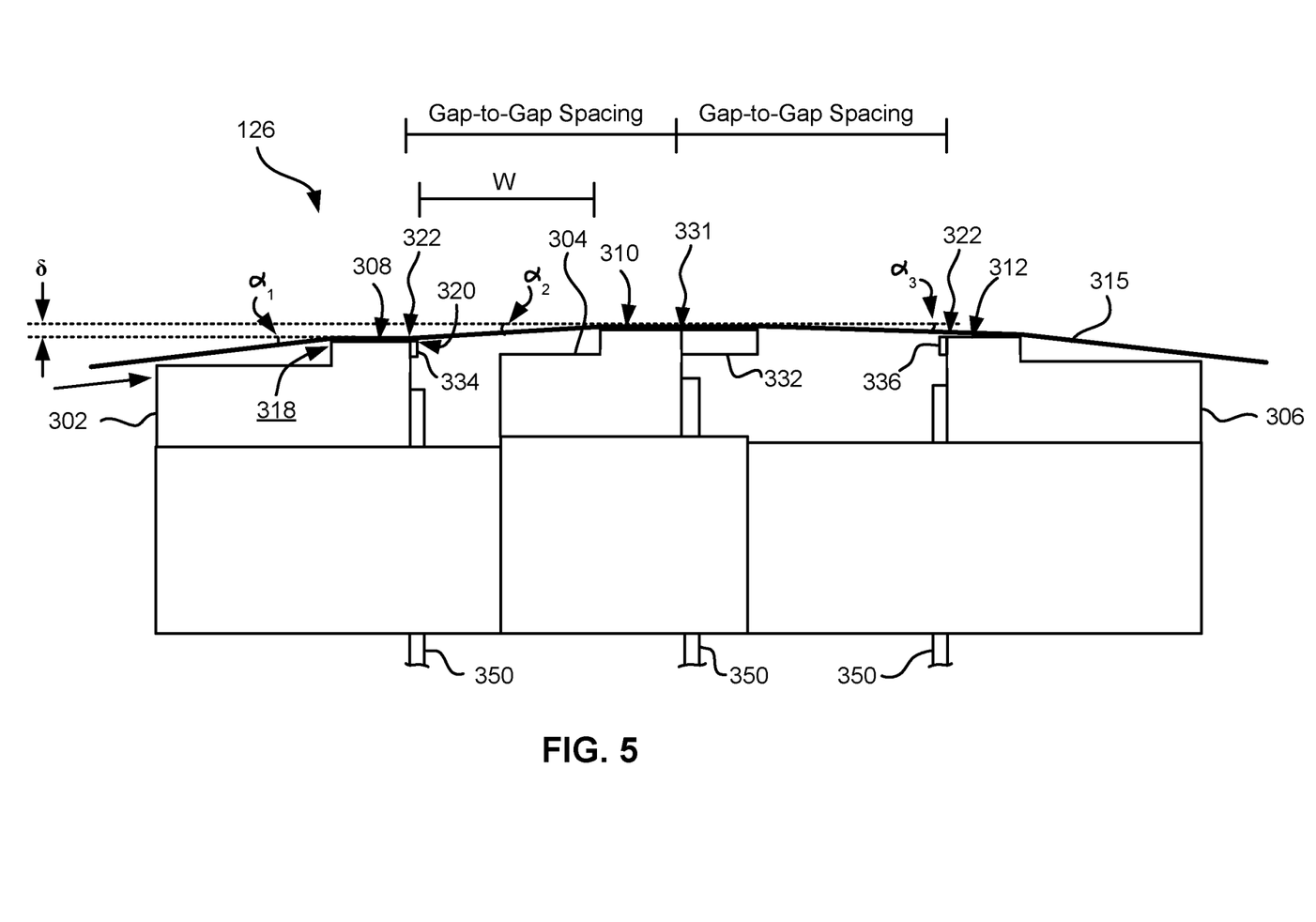
FIG. 5 is a side view of a magnetic tape head with three modules that all generally lie along about parallel planes, according to one embodiment.

FIG. 5 illustrates another embodiment of magnetic head 126 including first, second and third modules 302, 304, 306 each having a tape bearing surface 308, 310, 312 respectively, which may be flat, contoured, etc. Note that while the term "tape bearing surface" appears to imply that the surface of the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
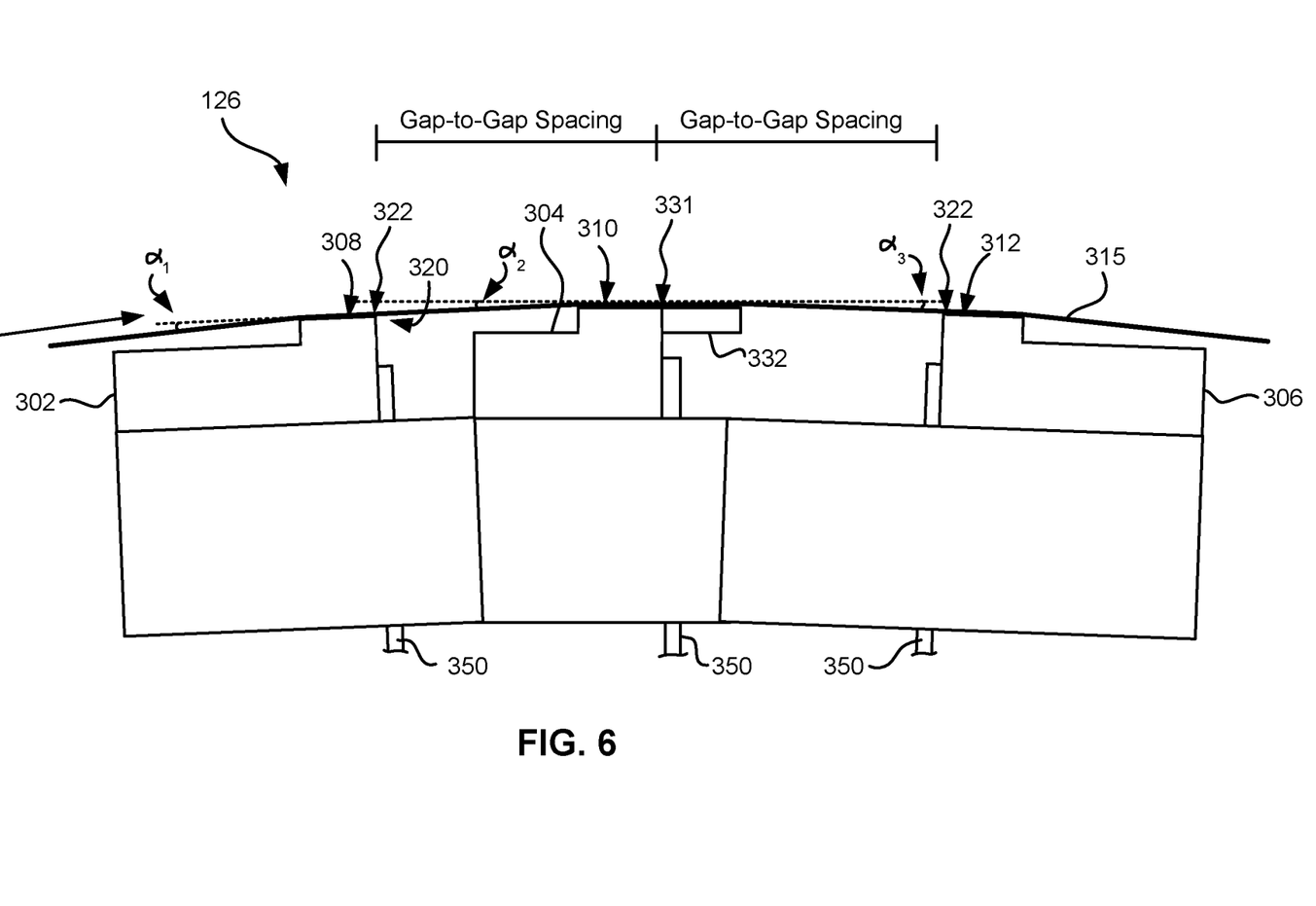
FIG. 6 is a side view of a magnetic tape head with three modules in a tangent (angled) configuration, according to one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller as tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
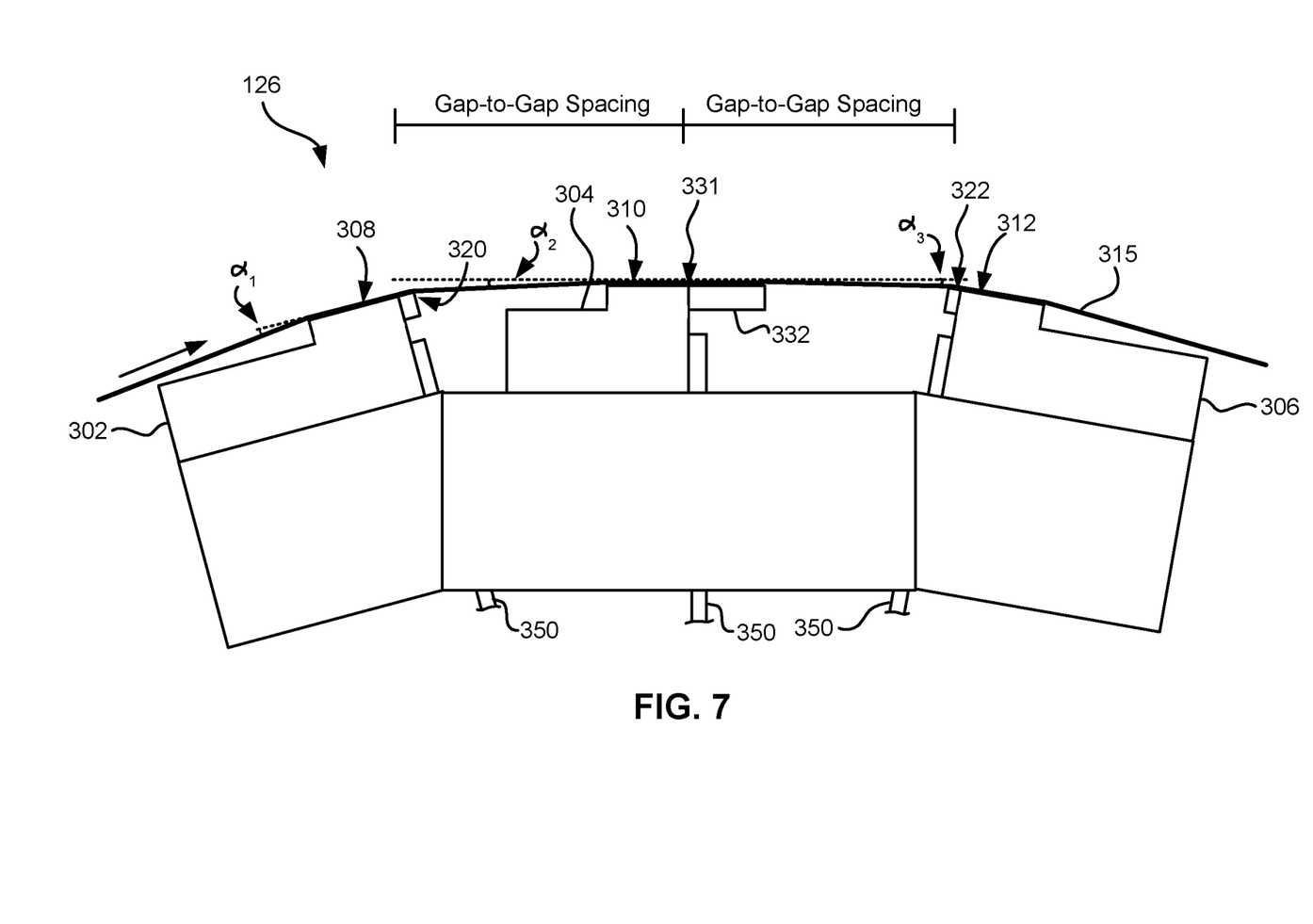
FIG. 7 is a side view of a magnetic tape head with three modules in an overwrap configuration, according to one embodiment.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As discussed previously, efforts are continually made to increase areal density of magnetic recording media to achieve a high signal-to-noise ratio (SNR). One approach to increase areal density may include use of magnetic recording media with smoother surfaces to minimize the magnetic head-to-magnetic recording medium spacing (HMS) and to minimize noise generated by the head(s) hitting asperities present on said medium. Moreover, in preferred approaches, the magnetic recording medium may have a low surface resistivity (e.g., less than 1E7 ohms/square) to avoid tribocharging and to minimize electro-chemical reactions that can cause: material buildups on the surfaces, spacing losses, and, in some cases, electrical shorts between the magnetic sensor and other head materials exposed to the surface of the magnetic recording medium.

In some approaches, carbon-black (e.g., acetylene black, furnace black, lamp black, thermal black, etc.) particles may be included within magnetic recording media to reduce the resistivity thereof. However, one disadvantage of using carbon black is the challenge associated with maintaining and/or increasing the smoothness of the media while maintaining the target resistivity due to the relatively large finite size of the carbon particles used and the difficulty in achieving a uniform distribution of the carbon particles in the target layers of the media.

In particular approaches utilizing magnetic tape based media, it may also be desirable to decrease the thickness of the tape media in order to increase the tape length and hence the cartridge capacity. Flexible magnetic media, such as magnetic tape, are composite materials, and may include at least the following layers in succession: a back coat layer, a substrate, an underlayer and a magnetic recording layer. One or more of the layers of a magnetic tape may include polymeric materials. For instance, in some approaches the back coat layer, the underlayer and the magnetic recording layer may include complex polymeric composites comprising a binder material, lubricant material, and various other particles such as magnetic particles and carbon black. However, the particle load necessary to impart the desired characteristics (e.g., magnetic characteristics, surface resistivity, etc.) in particular layers of the tape may hinder the ability to decrease the thickness of said layers while again maintaining and/or improving the desired media smoothness and target low surface resistivity.

Accordingly, in various inventive embodiments disclosed herein, one or more conductive polymers may be uniformly dispersed within at least one layer of a magnetic recording medium. The use of conductive polymers rather than conductive particles may reduce the particle load of the one or more different layers in which the conductive polymers are dispersed, thus reducing thickness, improving smoothness, improving manufacturability (as conductive polymer(s) may not reduce polymer flow as particles do) and improving conductivity (reducing resistivity). Furthermore, inclusion of the conductive polymers in at least one magnetic recording medium layer may result in a uniform surface resistivity thereof that is far superior compared to a layer including conductive particulates (but which is otherwise identical), as conductive particulates tend to clump and are often difficult to uniformly disperse throughout the layer material. Additionally, inclusion of the conductive polymers in at least one layer of a magnetic recording medium may not only increase the respective layer's overall conductivity, but also its mechanical strength, as well.

In approaches were the magnetic recording medium is a composite magnetic tape medium, the conductive polymer (s) may be included in any one of the tape medium's layers, such as the magnetic recording layer, the underlayer, the substrate, and/or the back coat layer. In preferred approaches, the conductive polymer may be included in at least the magnetic recording layer and the back coat layer of the composite magnetic tape medium.

Figure 8:
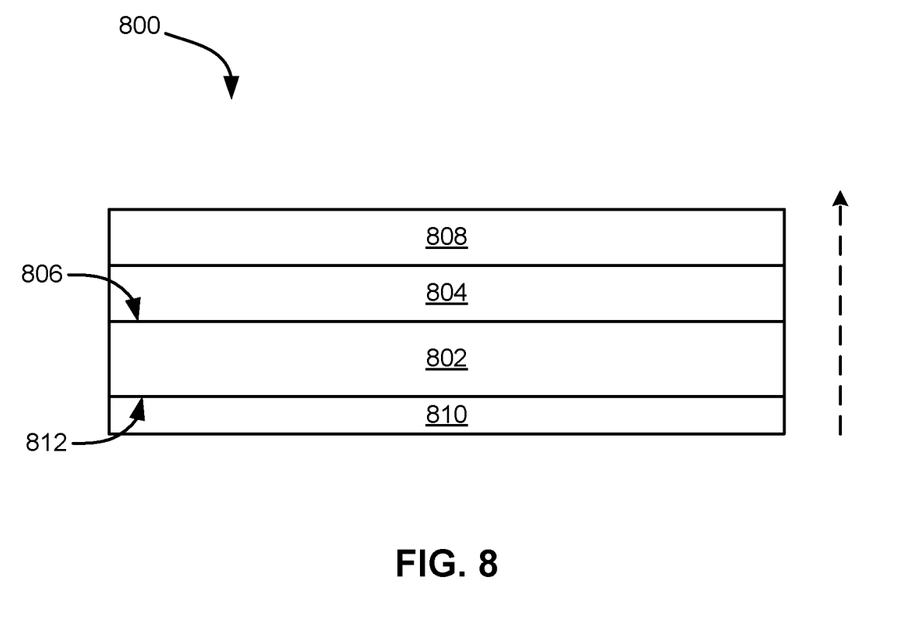
FIG. 8 is a schematic diagram of a simplified magnetic recording medium, according to one embodiment.

Referring now to FIG. 8, a representation of a simplified magnetic medium 800 is shown, according to one embodiment. As an option, the magnetic recording medium 800 may be implemented in conjunction with features from any other embodiment listed herein, such as those described with reference to the other FIGS. Of course, the magnetic recording medium 800 and others presented herein may be used in various applications and/or in permutations which may or may not be specifically described in the illustrative embodiments listed herein. For instance, the magnetic recording medium 800 may include more or less layers than those shown in FIG. 8, in various approaches. Furthermore, the magnetic medium 800 and others presented herein may be used in any desired environment. For instance, in some approaches, the magnetic medium 800 may be a magnetic recording tape, which may be used in conjunction with a tape drive system such as that shown in FIG. 1A. In other approaches, the magnetic medium 800 of FIG. 8 may be a magnetic hard disk, which may be used in conjunction with hard disk drives known in the art.

As shown in FIG. 8, the magnetic recording medium 800 includes a substrate 802. In some approaches, the substrate 802 may include: glass; ceramic materials; glass/ceramic mixtures; AlMg, silicon; silicon-carbide; polyesters (e.g., polyethylene terephthalate, polyethylene naphthalate, etc.); polyolefines e.g., polyethylene, polypropylene, etc.); polyimide; polyamide; polycarbonate, cellulose derivatives (e.g., cellulose triacetate, cellulose diaceteate, etc.); or other suitable nonmagnetic substrate material as would become apparent to one having skill in the art upon reading the present disclosure. In more approaches, the substrate 802 may be in the form of a film, a tape, a disc, etc.

As also shown in FIG. 8, the magnetic recording medium 800 includes one or more underlayers 804 positioned above the upper surface 806 of the substrate 802. The underlayer(s) 804 may be configured to promote data and/or ordered formation of one or more magnetic recording layers 808 positioned above the underlayer(s) 804. A back coat layer 810 may optionally be present below the lower surface 812 of the substrate 802.

In some approaches, the underlayer(s) 804, magnetic recording layer(s) 808 and/or the back coat layer 810 may include a binder. Binders may form a polymer matrix in which additional components (e.g., magnetic particles, lubricants, conductive polymers and other additives) may be dispersed. Suitable binders may include known thermoplastic materials, thermosetting resins, radiation hardening resins, reactive resins, and combinations thereof. Some exemplary binders may include, but are not limited to, polyurethane resins, polyester resins, vinyl chloride based resins, and other polymeric binders as would become apparent to one skilled in the art upon reading the present disclosure.

In more approaches, the underlayer(s) 804, magnetic recording layer(s) 808 and/or the back coat layer 810 may include magnetic particles. The magnetic particles may include, but are not limited to, $\gamma\text{-}Fe_2O_3$, cobalt-doped $\gamma\text{-}Fe_2O_3$, $Fe_3O_4$, $CrO_2$, barium ferrite, barium ferrite derivatives, metals (e.g., Fe, Co, Ni, Zn, and alloys thereof), and combinations thereof. In some approaches, the amount and/or composition of the magnetic particles in at least two of the aforementioned layers (e.g., the underlayer(s) 804, magnetic recording layer(s) 808, and the back coat layer 810) may be the same. In other approaches, the amount and/or composition of the magnetic particles in at least two of the aforementioned layers (e.g., the underlayer(s) 804, magnetic recording layer(s) 808, and the back coat layer 810) may be different.

In yet more approaches, the underlayer(s) 804, magnetic recording layer(s) 808 and/or the back coat layer 810 may include a lubricant material. Examples of the lubricant material may include fatty acids (e.g., palmitic acid, lauric acid, capric acid, stearic acid, caprylic acid, myristic acid, behenic acid, oleic acid, elaidic acid, linolic acid, etc.); fatty acid esters (e.g., butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, etc.); fatty acid amides; and other suitable lubricant material as would become apparent to one skilled in the art upon reading the present disclosure.

In still more approaches, the underlayer(s) 804, magnetic recording layer(s) 808 and/or the back coat layer 810 may include additional additives, including, but not limited to, a dispersant, an abrasive, a fungicide, a thermal stabilizer, an antistatic agent, etc.

In further approaches, a plurality of electrically conductive polymers may be dispersed (preferably uniformly dispersed) within/throughout at least one of: the substrate 802, the underlayer(s) 804, the magnetic recording layer(s) 808, and the back coat layer 810. Inclusion of the conductive polymers within at least one of the aforementioned layers may improve the conductivity (i.e., lower the resistance) and increase the mechanical properties (e.g., tensile strength, elastic modulus, etc.) of said layer. Moreover, inclusion of the conductive polymers within any of said layers may exhibit an improved conductivity (i.e., a lower resistivity) as compared to a layer that includes carbon black particles but is otherwise identical.

In some approaches, the conductivity of a particular layer of the magnetic recording medium 800 may be tuned by selecting the overall amount of the conductive polymers uniformly dispersed therein. In various approaches, the conductive polymers may be dispersed within at least one of these layers in an amount ranging from 0 to about 25 wt. %. In preferred approaches, the conductive polymers may be dispersed within at least one of these layers in an amount ranging from 1.0 wt. % to about 5 wt. %.

In yet more preferred approaches, a plurality of conductive polymers may be uniformly dispersed within at least one of the layers of the magnetic recording medium 800. However, in other approaches, a plurality of conductive polymers may be dispersed within at least one of the layers of the magnetic recording medium 800 such that for each layer in which the plurality of conductivity polymers is dispersed, there is a concentration gradient of said polymers therein extending in a thickness direction (the thickness direction being designated by the dotted arrow in FIG. 8).

It is important to note that in approaches where the conductive polymers may be dispersed in two or more layers of the magnetic recording medium 800, the overall amount of the conductive polymers in each layer may be the same or different. For instance, in approaches where the conductive polymers may be dispersed in two or more layers of the magnetic recording medium 800, there may a gradient (e.g., an increasing or decreasing gradient) in the conductive polymer concentration extending from one layer to at least another layer in a thickness direction (see dotted arrow in FIG. 8). For instance, by way of example only, the magnetic recording layer 808 may have a first plurality of conductive polymers dispersed therein, and at least one of the underlayer(s) 804, the substrate 802 and the back coat layer 810 may have a second plurality of conductive polymers dispersed therein. In this example, the conductive polymer concentration in the magnetic recording layer(s) 808 may be different than the conductive polymer concentration in at least one of the underlayer(s) 804, the substrate 802 and the back coat layer 810, such that there is concentration gradient in the conductive polymer concentration extending from the magnetic recording layer 808 to at least one of these other layers (e.g., the underlayer(s) 804, the substrate 802 and/or the back coat layer 810).

In more approaches, the desired/target surface electrical resistance of the magnetic recording medium 800, as measured on any square area of the surface thereof, may be less than or equal to about $10^7$ Ω/sq.

As noted previously, inclusion of the conductive polymers disclosed herein in at least one of the layers of the magnetic recording medium 800, not only results in a low, uniform surface resistivity, but also an improved smoothness of said layer. For instance, inclusion of the conductive polymers disclosed herein in at least one of the layers of the magnetic recording medium 800 may result in a low and uniform surface resistivity, as well as an improved smoothness as compared to a layer that is otherwise identical except for the inclusion of carbon black particles rather than said conductive polymers.

In additional approaches, each of the conductive polymers may have a molecular weight in a range between about 400 amu to about 600,000 amu. In one approach, at least two of the conductive polymers present within a particular layer of the magnetic recording medium 800 may have the same molecular weight and/or degree of polymerization. In another approach, at least two of the conductive polymers present within a particular layer of the magnetic recording medium 800 may have molecular weights and/or degrees of polymerization that are different relative to one another. In yet another approach, the plurality of conductive polymers present within a particular layer of the magnetic recording medium 800 may have a broad distribution of molecular weights and/or degrees of polymerization. For instance, in such approaches, the plurality of conductive polymers may include a varied mixture of oligomers and higher molecular weight polymers.

In further approaches, each of the conductive polymers dispersed within a particular layer of the magnetic recording medium 800 may be individually selected from a group consisting of: a linear polymer, a branched polymer, and a dendritic polymer. It is again important to note that the conductive polymers dispersed within a particular layer of the magnetic recording medium 800 may have polymeric structures (e.g., linear, branched, dendritic, etc.) that are the same or different relative to one another. For example, at least two of the conductive polymers present within a particular layer of the magnetic recording medium 800 may have linear polymeric structures. In another approach, at least two of the conductive polymers present within a particular layer of the magnetic recording medium 800 may have branched polymeric structures. In yet another approach, at least two of the conductive polymers present within a particular layer of the magnetic recording medium 800 may have dendritic polymeric structures. In still further approaches, the conductive polymers uniformly dispersed within a particular layer of the magnetic recording medium 800 may include any combination of linear polymers, branched polymers, and dendritic polymers.

In yet more other approaches, each of the plurality of conductive polymer dispersed within at least one layer of the magnetic recording medium 800 may have a nanofiber/nanotube form/structure. In one approach, such conductive polymer nanofibers/nanotubes may have a diameter of nanometer scale that is uniform along the length of the nanofiber/nanotube, as would become apparent to one skilled in the art upon reading the present disclosure.

In particular approaches, a conductive polymer may include, but is not limited to, polyacteylene, polypyrrole, polythiophene, polyphenylene, poly(p-phenylene vinylene), polyaniline, copolymers thereof, and combinations thereof. In one particular approach, at least two of the conductive polymers present within a particular layer of the magnetic recording medium 800 may have the same molecular structure. In other approaches, at least two of the conductive polymers present within a particular layer of the magnetic recording medium 800 may have different molecular structures. In yet other approaches, the conductive polymers uniformly dispersed within a particular layer of the magnetic recording medium 800 may include any combination of the aforementioned polymers (e.g., polyacteylene, polypyrrole, polythiophene, polyphenylene, poly(p-phenylene vinylene), polyaniline, copolymers thereof, etc.).

Several of the conductive polymers listed above (e.g., polyacteylene, polypyrrole, polythiophene, polyphenylene, poly(p-phenylene vinylene), polyaniline) may suffer from processing challenges due to decreased solubility. Accordingly, at least one conductive polymer included within at least one layer of the magnetic recording medium 800 may be modified to improve dispersion and/or solubility of the conductive polymer within said layer. Examples of modified conductive polymers may include derivatives of any of the conductive polymers disclosed herein. For instance, a modified conductive polymer may include a block copolymer in one approach, where the two or more different polymeric block components may include any of the conductive polymers disclosed herein. In another approach, a modified conductive polymer may be poly(3-hexylthiophene), which is able to be solvent cast.

In preferred approaches, a plurality of conductive polymers may be dispersed within the magnetic recording layer(s) 808 of the magnetic recording medium 800 (FIG. 8). In various approaches, a first plurality of conductive polymers may be dispersed within the magnetic recording layer(s) 808 and another (i.e., a second) plurality of conductive polymer may be dispersed in at least one of the substrate 802, the underlayer(s) 804 and the back coat layer 810. In more approaches, a first plurality of conductive polymers may be dispersed within the magnetic recording layer(s) 808, a second plurality of conductive polymers may be dispersed within the substrate 802, a third plurality of conductive polymers may be dispersed within the underlayer(s) 804 and a fourth plurality of conductive polymers may be dispersed within the back coat layer 810.

With continued reference to FIG. 8, the formation of one or more of the layers of the magnetic recording medium 800 may be achieved via known deposition and processing techniques. For example, any of components mentioned above (e.g., binders, magnetic particles, lubricants, conductive polymers, etc.) may be dissolved or dispersed in a solvent to prepare substantially homogenous coating compositions for the underlayer(s) 804, the magnetic recording layer(s) 808, and/or the back coat layer 810. These coating compositions may then be applied in the desired order on the substrate 802 using any known coating technique (e.g., roller coating, gravure coating, knife coating, etc.). Remaining solvent in each formed layer may be evaporated.

Additionally, the magnetic recording medium 800 may be a component in a housing. For instance, in some non-limiting approaches, this housing may be a magnetic tape cartridge (such as the exemplary tape cartridge shown in FIG. 1B). In further approaches, this housing may be a component of larger system such as a magnetic recording tape drive system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
   a substrate;
   an underlayer positioned above the substrate;
   a magnetic recording layer positioned above the underlayer; and
   a plurality of conductive polymers dispersed within the substrate, the underlayer, the magnetic recording layer, the substrate and the underlayer, the substrate and the magnetic recording layer, the underlayer and the magnetic recording layer, or the underlayer, the magnetic recording layer, and the substrate,
   wherein the conductive polymers are dispersed such that a concentration of the conductive polymers has a gradient in a single one of the layers in a thickness direction.

2. The magnetic recording medium as recited in claim 1, wherein the magnetic recording medium has a surface electrical resistance of between $10^3$ to $10^7$ Ω/sq.

3. The magnetic recording medium as recited in claim 1, wherein the plurality of conductive polymers are in nanofiber form having a diameter of nanometer scale, wherein the conductive polymers have a diameter that is uniform along a length thereof.

4. The magnetic recording medium as recited in claim 1, wherein each of the conductive polymers has a molecular weight in a range between about 400 to about 600,000 amu.

5. The magnetic recording medium as recited in claim 1, wherein each of the conductive polymers is individually selected from a group consisting of: a linear polymer, a branched polymer, and a dendritic polymer.

6. The magnetic recording medium as recited in claim 1, wherein each of the conductive polymers is individually selected from a group consisting of: polyacteylene, polypyrrole, polythiophene, polyphenylene, poly(p-phenylene vinylene), polyaniline, copolymers thereof, and combinations thereof.

7. The magnetic recording medium as recited in claim 1, wherein the at least one of the conductive polymers is a modified polymer, wherein at least one modified polymer is a block co-polymer.

8. The magnetic recording medium as recited in claim 1, wherein the plurality of conductive polymers is dispersed within the magnetic recording layer.

9. The magnetic recording medium as recited in claim 8, wherein another plurality of conductive polymers is dispersed within at least one of the substrate and the underlayer.

10. The magnetic recording medium as recited in claim 1, further comprising a back coat layer positioned below the substrate.

11. The magnetic recording layer as recited in claim 1, where an amount of the conductive polymers dispersed within at least one of the substrate, the underlayer and the magnetic recording layer is in a range from greater than 0 wt. % to about 15 wt. %.

12. The magnetic recording medium as recited in claim 1, wherein the plurality of conductive polymers having a nanofiber structure are dispersed within the substrate.

13. A product, comprising:
a housing
the magnetic recording medium as recited in claim 1 in the housing.

14. A magnetic recording medium, comprising:
a substrate;
an underlayer positioned above the substrate;
a magnetic recording layer positioned above the underlayer;
a first plurality of conductive polymers dispersed within the magnetic recording layer; and
a second plurality of conductive polymers dispersed in at least one layer selected from the group consisting of: the substrate and a back coat layer positioned below a lower surface of the substrate,
wherein the conductive polymers are in nanofiber form having a diameter of nanometer scale.

15. The magnetic recording medium as recited in claim 14, wherein the conductive polymers have a diameter that is uniform along a length thereof.

16. The magnetic recording medium as recited in claim 14, wherein the magnetic recording medium has a surface electrical resistance of between $10^3$ to $10^7$ Ω/sq, wherein the conductive polymers are dispersed within layer or layers such that a concentration of the conductive polymers has a gradient in one of the layers in a thickness direction.

17. The magnetic recording medium as recited in claim 14, wherein each of the conductive polymers is individually selected from a group consisting of: polyacteylene, polypyrrole, polythiophene, polyphenylene, poly(p-phenylene vinylene), polyaniline, copolymers thereof, and combinations thereof.

18. A magnetic recording medium, comprising:
a substrate;
an underlayer positioned above the substrate;
a magnetic recording layer positioned above the underlayer; and
a first plurality of conductive polymers dispersed within the magnetic recording layer, a second plurality of conductive polymers dispersed within the substrate, a third plurality of conductive polymers dispersed within the underlayer, and a fourth plurality of conductive polymers dispersed within a back coat layer,
wherein one or more of the conductive polymers has a nanofiber structure having a diameter of nanometer scale.

19. The magnetic recording medium as recited in claim 18, wherein the magnetic recording medium has a surface electrical resistance of between $10^3$ to $10^7$ Ω/sq, wherein the conductive polymers are dispersed within layer or layers such that a concentration of the conductive polymers has a gradient in one of the layers in a thickness direction.

* * * * *